(12) United States Patent
Suzuki et al.

(10) Patent No.: US 6,444,949 B1
(45) Date of Patent: Sep. 3, 2002

(54) APPARATUS FOR PRODUCING A PRINTER HEAD AND APERTURE PROCESSING DEVICE

(75) Inventors: Isao Suzuki; Masashi Shimosato, both of Shizuoka-ken; Hiroshi Ito, Kawasaki, all of (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/498,443

(22) Filed: Feb. 4, 2000

(30) Foreign Application Priority Data

Feb. 4, 1999 (JP) ............................... 11-027222
Oct. 19, 1999 (JP) ............................... 11-296699

(51) Int. Cl.⁷ ............................................. B23K 26/00
(52) U.S. Cl. ............................. 219/121.77; 219/121.7; 219/121.73
(58) Field of Search ........................ 219/121.77, 121.7, 219/121.73, 121.75

(56) References Cited

U.S. PATENT DOCUMENTS 5,208,604 A      5/1993   Watanabe et al.
5,517,000 A   *  5/1996   Nishiwaki et al. ..... 219/121.77

* cited by examiner

Primary Examiner—M. Alexandra Elve
(74) Attorney, Agent, or Firm—Frishauf, Holtz, Goodman & Chick, P.C.

(57) ABSTRACT

The present invention comprises an array lens illumination system for shaping laser light in a band-like beam, a mask which is arranged in an optical path of the laser light from the array lens illumination system and on which a plurality of circular apertures are formed in a staggered shape in accordance with an arranged state of orifices formed on an orifice plate, a shift member which is arranged at the incident side of the laser light rather than the mask, and which splits the laser light incident on the mask into a plurality of beams in accordance with the number of circular apertures and irradiates the split beams onto the respective circular apertures of the mask, and a projecting lens for forming an image of the laser light passing through the mask on the orifice plate.

13 Claims, 7 Drawing Sheets

APPARATUS FOR PRODUCING A PRINTER HEAD AND APERTURE PROCESSING DEVICE

BACKGROUND OF THE INVENTION

The present invention relates to a method and apparatus of producing a printer head, which forms ink outlets of an ink-jet printer by forming apertures shaped in a reverse taper to the laser irradiating direction, and also provides an aperture processing device used for the method and apparatus.

At a head portion of the ink-jet printer, a metal orifice plate 3 at which a plurality of orifices 2 are formed as ink outlets is bonded to a plurality of ink chambers 1 as shown in FIG. 13. The ink chambers 1 are sectioned by dissepiments 4, and ink drops are discharged from the orifice 2 by a discharging mechanism (not shown) for executing a predetermined ink discharging as shown in FIG. 14. As for the discharging mechanism, for example, the bubble-jet system and the kayser system comprising a piezoelectric vibration plate are known.

The orifice 2 of such an ink-jet printer is formed to have a diameter of about 30 microns, and a plate of Ni, covar and the like having the thickness of about 50 $\mu$m is used as the metal orifice plate 3.

Generally, a plating method called the electrotyping is employed for the production of the metal orifice plate 3. When the metal orifice plate 3 is bonded to the printer head portion, in the following printer head producing process, the center of the orifice 2 and the center of the ink chamber 1 are shifted by the amount $\Delta A$. In other words, it is difficult to maintain the accuracy in positioning the orifices 2 of the metal orifice plate 3 and the ink chambers 1. In addition, the orifice 2 is filled up with a bonding agent 5 as represented by B.

To solve this problem, a processing method of bonding the orifice plate to the head portion of the printer and then opening the orifice 2 by the laser light is proposed. In this case, the mask on which the aperture pattern is used.

Incidentally, when the orifice is processed by the mask, the laser light is irradiated not only to the aperture pattern of the mask, but also to almost the entire surface of the mask. For this reason, the laser light passing through the aperture pattern forms an image on the orifice plate and thereby processes the orifice.

The accuracy in the diameter of the orifice is determined in accordance with the accuracy in the mask, and therefore, the mask is required to be produced at high accuracy, and a thin metal plate having a thickness of less then 50 $\mu$m is used to keep the accuracy.

Orifices 6a are formed in the staggered shape on a mask 6 as shown in FIG. 15. That is, the orifices 6a are arranged with a predetermined interval along the longitudinal direction of the band-shaped mask 6, and two of the orifices constitute one group. Two circular apertures 6a in each group are displaced by the amount $\Delta y$ in the width direction. The reason is that the shift of timing of the control in the paper scanning direction can be canceled by shifting the timing of the control of the ink discharge for every two apertures.

The laser light beam irradiated onto the mask 6 is shaped in a band so that the orifices 6a are positioned in the range of the irradiation as represented by part A of oblique lines in the figure.

However, when the orifices 6a are formed in the staggered shape on the mask 6, the width of the laser light beam irradiated on the mask 6 must be large in accordance with the amount of shift $\Delta y$ of the orifices 6 a. For this reason, the energy density per unit area in the beam shape of the laser light is lowered, and the efficiency of use of the laser light energy is lowered in accordance with this. In other words, a high power laser device is required in accordance with lowering of the efficiency of use of the laser light energy.

Further, if the beam shape of the laser light is made large and its energy is increased, the energy which is input to the mask 6 is increased, and therefore, the mask 6 formed of a thin metal plate is often deformed or damaged.

BRIEF SUMMARY OF THE INVENTION

The present invention provides a method and apparatus of producing a printer head capable of irradiating an aperture pattern formed in a staggered shape onto a mask without lowering the efficiency of use of the laser light energy, and also provides an aperture pattern.

A method of producing a printer head, according to claim 1, comprises the steps of bonding a plate to be processed which is formed of a macromolecular material, on a printer head housing on which a plurality of ink grooves are formed; shaping laser light in a predetermined beam; allowing the laser light to pass through a mask on which an aperture pattern are formed in the staggered shape, in accordance with an opening shape of the plate; splitting the laser light in accordance with the aperture pattern before the step of allowing the laser light to pass; and forming an image of the laser light passing through the mask on the plate by an image forming optical system and forming an opening on the plate.

According to the present invention, the aperture pattern formed in the staggered shape can be irradiated onto the mask without extending the beam shape of the laser light, and therefore, the efficiency of use of the laser light energy can be enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be explained below with reference to FIGS. 1 to 6.

Figure 1:
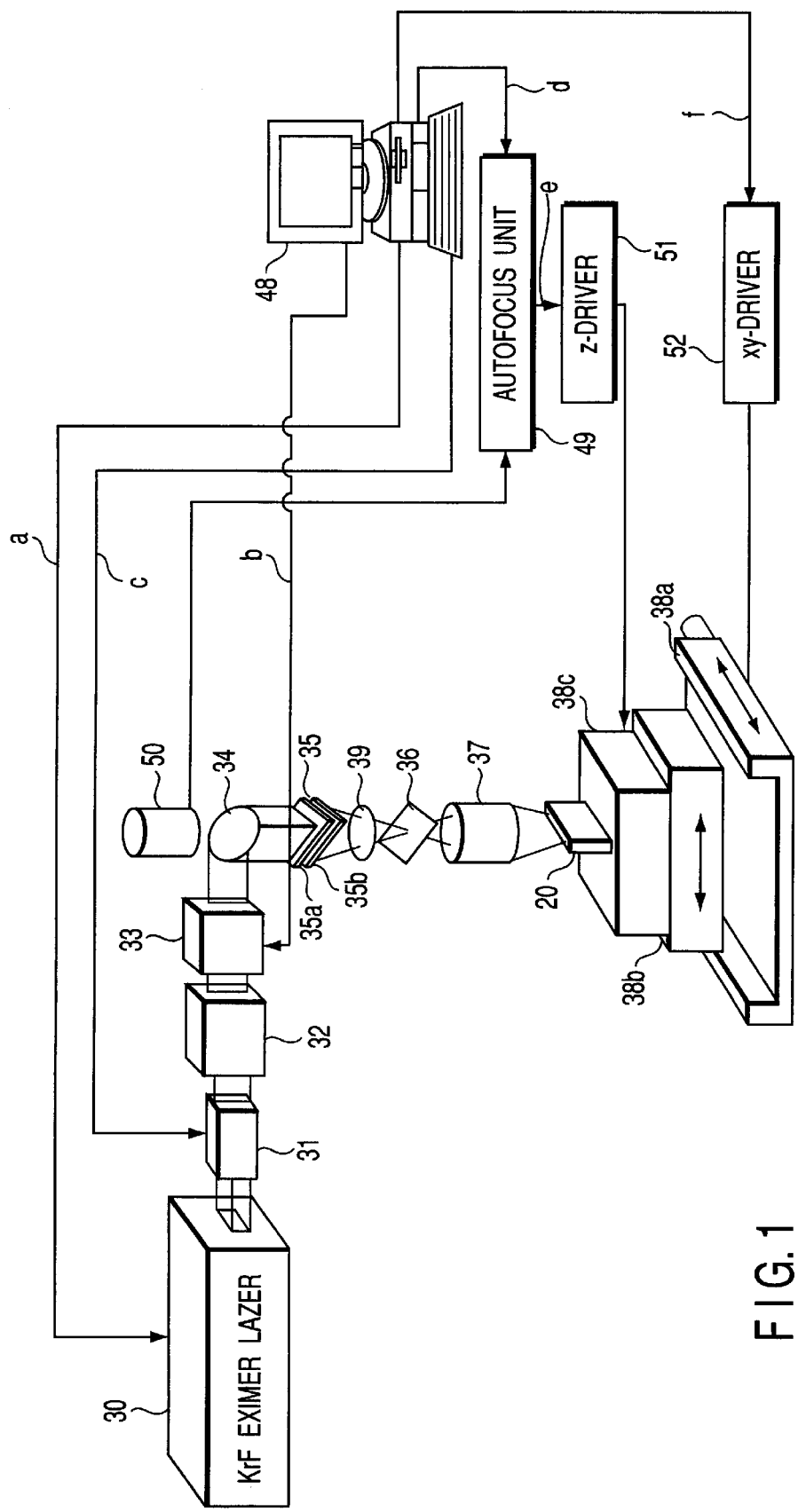
FIG. 1 is a diagram showing an aperture processing device according to an embodiment of the present invention.

FIG. 1 is a diagram showing a printer head producing apparatus, i.e. an orifice processing device for forming an orifice of an ink-jet printer.

In the figure, reference numeral 30 denotes an eximer laser oscillator, which outputs a pulse-like laser light beam having a wavelength of less than 400 nm. A variable attenuator 31, an collimator 32, an image rotator 33, and a mirror 34 are aligned in an optical path of the laser light beam which is output from the eximer laser oscillator 30, and an array lens illumination system 35, a relay lens 39, a mask 36 and a projection lens (imaging lens) 37 are further aligned in a reflecting optical path of the mirror 34.

On the other hand, an x-stage 38a, a y-stage 38b and a z-stage 38c are provided in the optical axis of the projection lens 37, and an orifice plate (a processed plate) 20 is placed as a processed article on the z-stage 38c.

A specific structure of the optical system from the array lens illumination system 35 to the relay lens 39, the mask 36 and the projection lens 37 will be explained with reference to FIG. 2.

As shown in this figure, the array lens illumination system 35, the relay lens 39, the mask 36 and the projection lens 37 are aligned in the optical path of the laser light beam.

Figure 2:
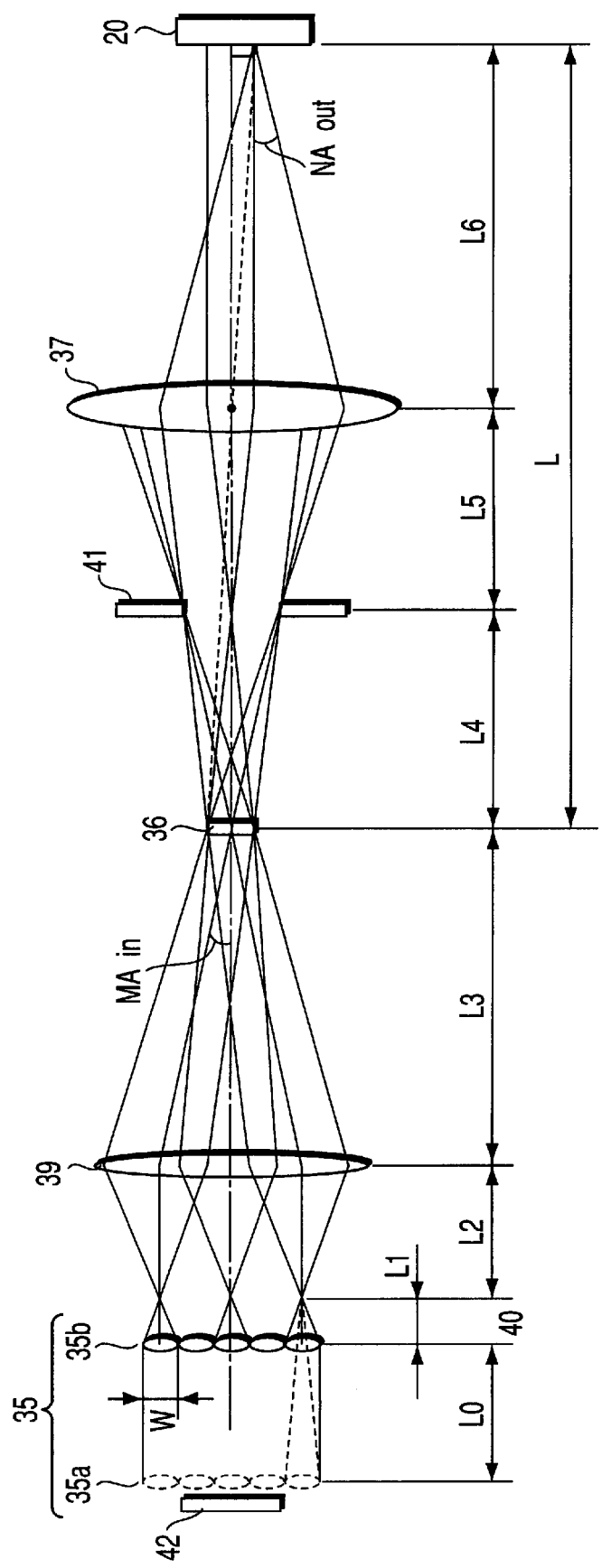
FIG. 2 is a diagram specifically showing an array lens illumination system, a mask and a projecting lens.
Figure 3:
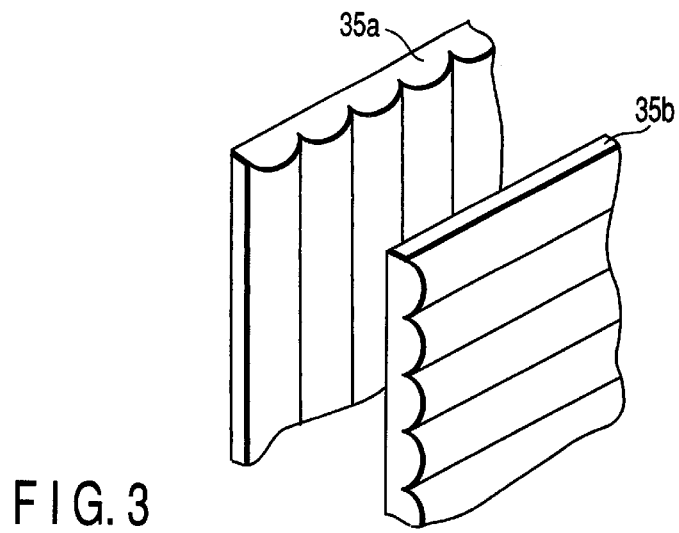
FIG. 3 is a diagram showing a part of the array lens illumination system.

In the array lens illumination system 35, two cylindrical array lenses 35a and 35b are arranged in a direction perpendicular with one another, with an interval Lo disposed therebetween, as shown in FIGS. 2 and 3.

A condensing surface 40 (shown in FIG. 2) of each of the cylindrical array lenses 35a and 35b is set to correspond to the same surface in a distance $L_1$ from the cylindrical array lens 35b.

The mask 36 is arranged in relation to the array lens illumination system 35, relay lens 39, entrance pupil (diaphragm) 41 and the projection lens 37, so that an image on the condensing surfaces 40 of the cylindrical array lenses 35a and 35b is formed on a surface of the entrance pupil 41 of the projection lens 37 by the relay lens 39 and thereby telecentric conditions to the projection lens 37 are completed.

In such a telecentric optical system, a reverse-taper orifice having an axis perpendicular to the surface of the orifice plate 20 is formed.

Figure 4:
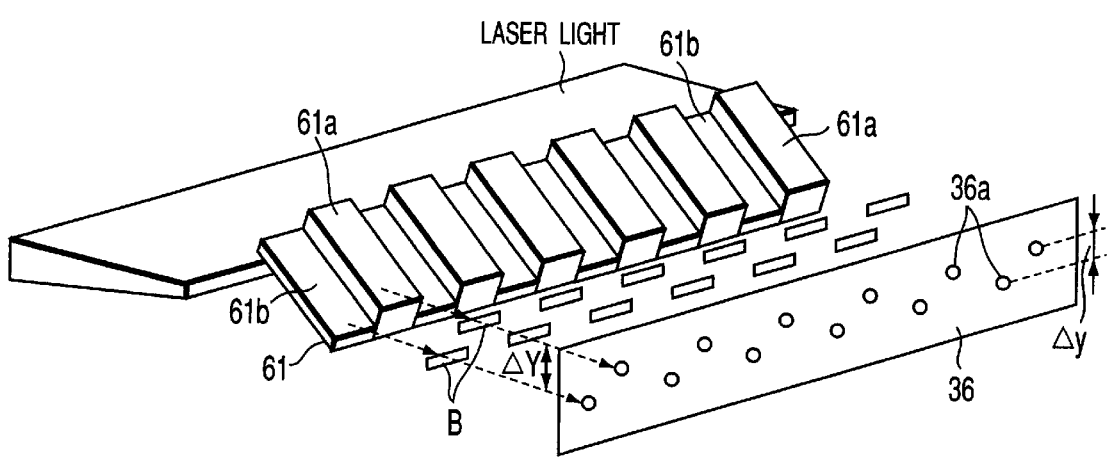
FIG. 4 is a perspective view showing the arrangement of a shift member and the mask.
Figure 5:
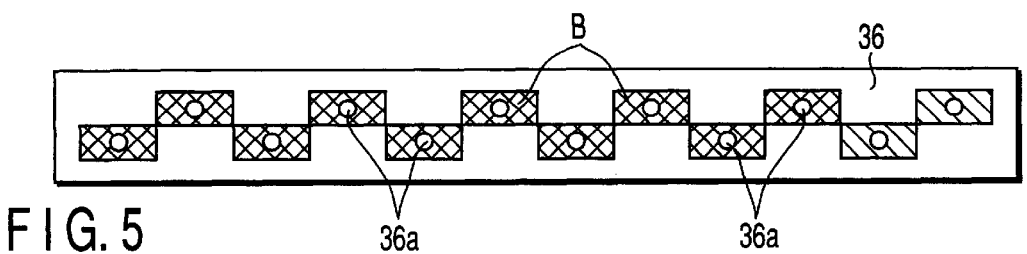
FIG. 5 is a plane view showing a state in which beams split by the shift member irradiate the mask.
Figure 6:
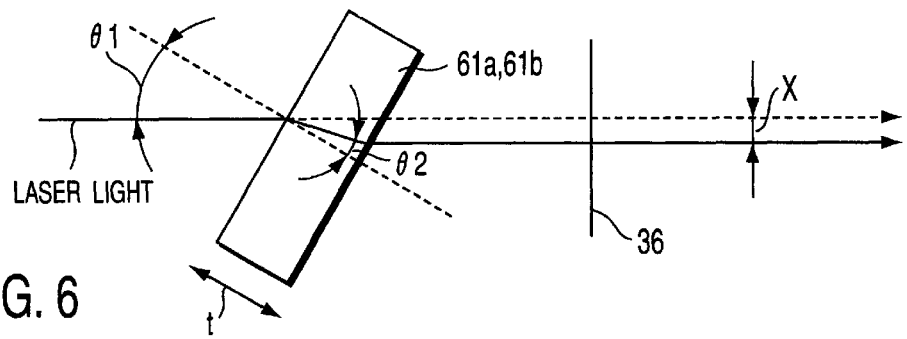
FIG. 6 is a diagram explaining the amount of shift of the laser light passing through the shift member.

The mask 36 is shaped in a narrow rectangle as shown in FIGS. 4 and 5, and a plurality of circular apertures 36a are formed on the mask 36 along the longitudinal direction thereof, in the staggered shape with a predetermined pitch interval, to form orifices used as ink outlets of an ink-jet printer.

In the present embodiment, two circular apertures 36a constituting a group are formed with a predetermined interval along the longitudinal direction of the band-shaped mask 36 and two circular apertures 36a in each group are displaced from one another by an amount of displacement $\Delta y$ along the width direction.

The number of the circular apertures 36a in each group, formed on the mask 36, is not limited to two, but may be three or more.

To irradiate the laser light beam onto the mask 36 at a uniform intensity distribution, the collimator 32 has a function of converting the beam shape so that the laser light beam which is output from the eximer laser oscillator 30 corresponds to a rectangular aperture of the array lenses 35a and 35b.

The beam size of the laser light beam on the mask 36 is determined in accordance with the focal distance of the array lens illumination system 35 and the relay lens 39, and the width of the array lens illumination system 35.

The relationship between the distance and the focal distance in the array lens illumination system 35, the relay lens 39, the mask 36 and the projection lens 37 can be explained specifically as follows.

It is assumed that the focal distances of the respective cylindrical array lenses 35a and 35b are represented by $f_0$ and $f_1$, the focal distance of the relay lens 39 by $f_2$, the focal distance of the projection lens 37 by $f_3$, the width of unit array lenses of the respective cylindrical array lenses 35a and 35b by W, the number of rows of the cylindrical array lenses 35a and 35b by N, the beam size of the rectangular laser light beam determined by the array lens illumination system 35 by XY, and the magnifying power of the projection lens 37 by M. The interval $L_0$ of the cylindrical array lenses 35a and 35b is, as shown in FIG. 2, $$L_0 = f_0 - f_1 \tag{1}$$

and, the distance between the array lens illumination system 35 and its focal point is, $$L_1 = f_1 \tag{2}$$

Diameter d of the relay lens 39 is $$d = w(N + L_2/L_1 - 1) \tag{3}$$

The focal distances $f_0$ and $f_1$ of the respective cylindrical array lenses 35a and 35b are $$f_0 = f_2 / X \cdot W \tag{4}$$

$$f_1 = f_2 / Y \cdot W \tag{5}$$

Further, there are the following relationships $$L_3 = f_2 \tag{6}$$

$$f_2 = W(N-1)/NA_{in}/2 \tag{7}$$

$$L_2 = f_2(f_2/L_4 + 1) \tag{8}$$

$$NA_{in}=NA_{out}/M \quad (9)$$

A diameter of pupil EPD of the entrance pupil 41 of the projection lens 37 is expressed by $$EPD=L_4 \cdot NA_{in} \cdot 2 \quad (10)$$

Moreover, $$f_3=L(2+M+1/M) \quad (11)$$

$$L_6=(1+M) \cdot f_3 \quad (12)$$

$$L_5=f_3 \quad (13)$$

$$L_4=(1+1/M) \cdot f_3 - f_3 = f_3/M \quad (14)$$

The mask 36 is arranged to have a conjugated positional relationship with an orifice plate 20 and the projection lens 37. Thus, the hole shape of the mask 36 is reflected at high accuracy on the orifice plate 20 and is formed thereon.

A shift member 61 serving as shift optical means for splitting the laser light irradiated onto the mask 36 for each of the circular apertures 36a formed on the mask 36 is arranged at the side of the mask 36 on which the laser light is incident, as shown in FIG. 4.

As described above, the laser light determined to have a predetermined beam size by the array lens illumination system 35 in accordance with the focal distance of the array lens illumination system 35 and the relay lens 39, is split into rectangular beams B corresponding to the respective circular apertures 36a of the mask 36 by the shift member 61 as shown in FIG. 5. Then the rectangular beams B irradiate the respective circular apertures 36a.

That is, on the shift member 61, first refracting plates 61a and second refracting plates 61b that are formed in a rectangular shape with the width corresponding to the pitch of the circular apertures 36a and have different thickness, are arranged alternately by bonding their lateral side edges, and are inclined at the same angle to the optical axis of the laser light. That is, the refracting plates 61a and 61b are equal in the inclination of the incident surface and the emitting surface of the laser light and are different in thickness. The split laser light beams emitted from the emitting surface are made incident approximately parallel with the position of the entrance pupil 41 of the projection lens 37, i.e. dispersively.

Thus, the laser light refracted by the first refracting plates 61a and the second refracting plates 61b is different in the emitted position, i.e. an amount of shift ΔY in accordance with the difference in the thickness of the refracting plates. The laser light is split into the rectangular beams B having the lateral sizes corresponding to the respective refracting plates 61a and 61b and then rectangular beams B are incident on the mask 36.

Therefore, the circular apertures 36a that are paired and arranged in the staggered shape can be illuminated by the split rectangular beams B, by controlling the amount of shift ΔY in accordance with the thickness of the refracting plates 61a and 61b.

If the angle of incidence of the laser light to the first refracting plate 61a or the second refracting pate 61b having a thickness t is represented by $\theta_1$ and the emitting angle thereof is represented by $\theta_2$, the amount of shift X of the emitted laser light can be obtained in the following equation $$x = t/\cos(\theta_2) \cdot \sin(\theta_1 - \theta_2) \quad (15)$$

but, $$\theta_1 = n \cdot \sin \theta_2 \quad (16)$$

where n represents the refractive index of the refracting plates 61a and 61b. The angle of incidence $\theta_1$ is determined on the basis of the angle of inclination of the refracting plates 61a and 61b to the optical axis of the laser light. Therefore, the rectangular beams B emitted from the refracting plates 61a and 61b can be irradiated to the paired circular apertures 36a each displaced in the width direction of the mask 36, by setting the angle of incidence $\theta_1$ of the laser light to the refracting plates 61a and 61b, and the thickness t of the refracting plates 61a and 61b.

That is, the beams can be certainly irradiated onto the circular apertures 36a without expanding the beam shape of the laser light, by forming the circular apertures 36a on the mask 36 in the staggered shape, even if the paired circular apertures 36a are displaced in the width direction of the mask 36.

On the other hand, a fine processing controller 48 shown in FIG. 1 controls the entire aperture processing device, and has the following functions.

The fine processing controller 48 has a function of transmitting a laser control signal a to the eximer laser oscillator 30 as a trigger signal and controlling the operations of the eximer laser oscillator 30.

The fine processing controller 48 has also a function of transmitting a rotary speed control signal b to the image rotator 33, and continuously rotating the image rotator 33 during, for example, the irradiation of the laser light of about 200 pulses that is required for the aperture processing on the orifice plate 20.

The fine processing controller 48 has also a function of transmitting a fluence control signal c to the variable attenuator 31 and adjusting the output intensity of the laser light in accordance with the pulse of the fluence control signal c.

The fine processing controller 48 has also a function of transmitting a focus control signal d to an auto-focus unit 49 and forming a mask image on the orifice plate 20.

A camera 50 is connected to the auto-focus unit 49. The fine processing controller 48 has also a function of obtaining the focus shift on the basis of the mask image on the orifice plate 20 picked up by the camera 50 and transmitting a drive signal e to correct the focus shift to a z-driver 51. The z-driver 51 has a function of operating the z-stage 38c in accordance with the drive signal e from the auto-focus unit 49.

The fine processing controller 48 has also a function of transmitting a position control signal f to an xy-driver 52 and operating the xy-tables 38a and 38b to project the mask image onto the orifice plate 20.

Next, the operations of the above-constituted apparatus will be explained.

The pulse-like laser light which is output from the eximer laser oscillator 30 is first made incident on the variable attenuator 31, so that its output intensity is adjusted. Next, the collimator 32 converts the laser light emitted from the variable attenuator 31 into a band-shaped beam so as to cover all the circular apertures 36a on the mask 36, and transmits the beam to the image rotator 33.

The laser light which is output from the eximer laser oscillator 30 has non-uniform intensity distribution. Therefore, the image rotator 33 is continuously rotated during, for example, the irradiation of the laser light having about 200 pulses required for the aperture processing on the orifice plate 20, and the laser light is formed on the incident surface of the array lens illumination system 35 to have the intensity distribution of the rotation symmetry.

The laser light emitted from the image rotator 33 is reflected on the mirror 34 and is made incident on the array lens illumination system 35.

This laser light is condensed by a condensing surface 40 by two cylindrical array lenses 35a and 35b of the array lens illumination system 35, and is irradiated onto the mask 36 by the relay lens 39.

The condensing surface 40 of the array lens illumination system 35 forms an image on the surface of the entrance pupil 41 of the projecting lens 37 by the relay lens 39. Therefore, the orifice is formed on the orifice plate 20 by projecting the laser light onto the orifice plate 20 through the projecting lens 37.

The shift member 61 is arranged at the incident side of the mask 36. The first refracting plates 61a and the second refracting plates 61b having different thickness are arranged alternately on the shift member 61. The amount of shift X of the laser light which is incident on each of the refracting plates is set in accordance with the thickness t of the refracting plate and the angle of inclination $\theta_1$ to the optical axis of the laser light.

For this reason, the rectangular beams B which are split by the refracting plates 61a and 61b and then emitted are displaced in the width direction of the mask 36, two of which are paired, and are certainly irradiated onto the respective circular apertures 36a arranged in the staggered shape.

That is, even if the circular apertures 36a are displaced in the width direction to be shaped in birds on the mask 36, the beams can be irradiated onto all the circular apertures 36a without extending the beam shape of the laser light in accordance with the shift of the circular apertures 36a and, therefore, the energy density per unit area of the laser light is not lowered.

In other words, if the beam shape of the laser light is extended, the output of the eximer laser 30 must be increased to obtain the laser light of a predetermined intensity. However, when the shift member 61 is employed as disclosed in the present invention, the beam shape of the laser light does not need to be extended and, therefore, the output of the eximer laser 30 does not need to be increased. That is, the efficiency in use of the energy is improved.

The first refracting plates 61a and the second refracting plates 61b of the shift member 61 are separate bodies. However, they may be integrally formed of one member. Otherwise, the plates formed separately may be integrated by bonding and fixing their lateral side surfaces.

FIGS. 7A to 7D are diagram showing steps of the producing method of printer head according to the present invention.

Figure 7A:
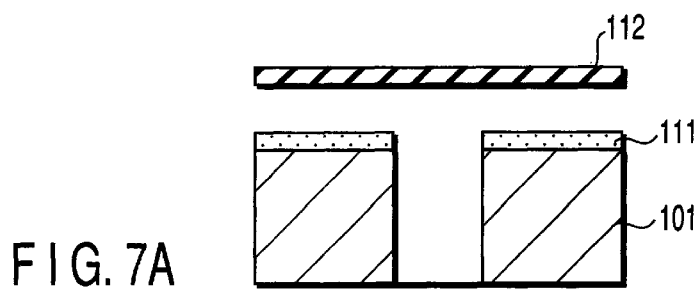
FIGS. 7A to 7D are diagrams showing steps of production of a printer head according to the present invention.
Figure 7B:
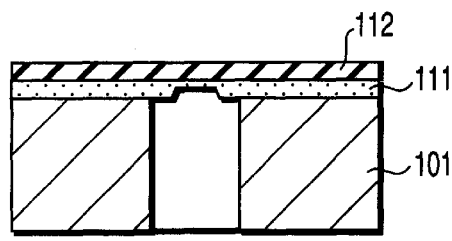

First, a bonding agent 111 is applied to a head 101 of the ink-jet printer as shown in FIG. 7A and a polyimide sheet 112 of a macromolecular material is bonded onto the bonding agent 111 as a plate to be processed as shown in FIG. 7B. As for the plate to be processed, not only the polyimide sheet 112, but polysulfone or the like may be used.

Figure 7C:
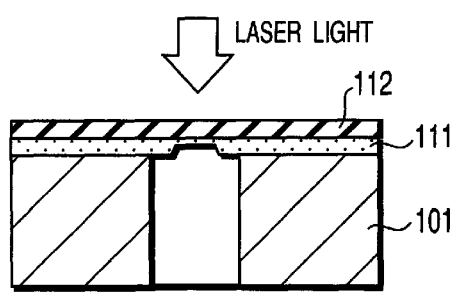
Figure 7D:
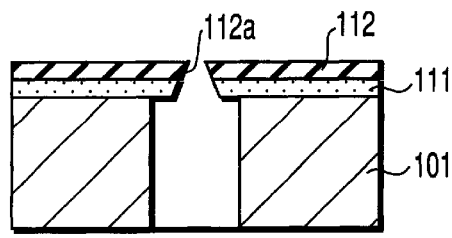

Next, the head 101 is placed and positioned on the z-stage 38c shown in FIG. 1, and the laser light passing through the mask 36 and the projecting lens 37 (both shown in FIG. 1) is irradiated onto the polyimide sheet 112 as shown in FIG. 7C. Thus, an orifice 112a can be processed in a predetermined shape, at high accuracy, on the polyimide sheet 112 as shown in FIG. 7D.

Figure 8:
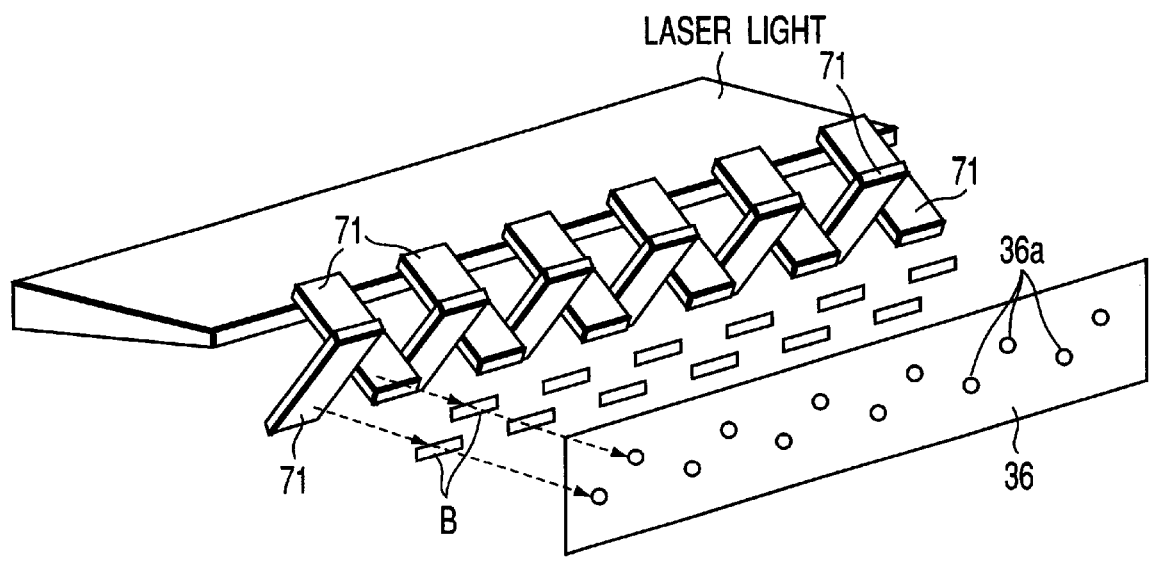
FIG. 8 is a perspective view showing an arranged state of the refracting plates and the mask according to another embodiment of the present invention.

FIG. 8 shows a modified example of the shift optical means according to the present invention.

In this example, a plurality of refracting plates 71 formed of a material such as quartz which allows the laser light to pass therethrough, in a rectangular shape, at the incident side of the mask 36, are inclined respectively at different angles based on the optical axis of the laser light, to the paired circular apertures 36a formed on the mask 36 in the staggered shape.

In this example, a pair of adjacent refracting plates 71 are arranged at shifted angles so as to be inclined in the different directions, as shown in FIG. 8. Thus, the laser light emitted from the array lens illumination system 35 in a predetermine beam shape is shifted and split at the amount of shift corresponding to the difference in the angles of inclination of the respective refracting plates 71, and therefore, the rectangular split beams B can be irradiated onto the paired circular apertures 36a displaced in the width direction of the mask 36.

That is, in the present example, the refracting plates 71 have the same thickness, but the amount of shift of the emitted laser light is varied in accordance with the angle of inclination. Therefore, the beams can be irradiated onto all the circular apertures 36a formed on the mask 36 without extending the beams shape, similarly to the above-described example.

Figure 9:
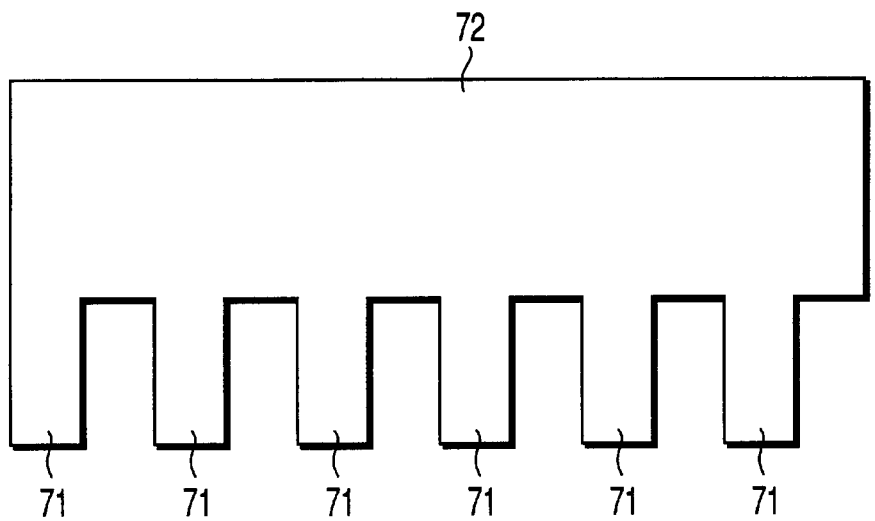
FIG. 9 is a diagram showing a modified example of another embodiment of the present invention.

In the present example, the refracting plates 71 are divided. However, a plurality of refracting plates 71 may be integrally formed with a predetermined interval, at the end of a substrate 72, as shown in FIG. 9. In addition, two substrates 72 may be arranged at different angles of inclination to the optical axis of the laser light.

Thus, the refracting plates 71 can be easily and exactly arranged when they are integrally formed.

Next, a modified example about further improvement of the shift optical means according to the present invention will be explained. In this example, reverse-tapered orifices having an axis perpendicular with the plate surface of the orifice plate 20 are formed at a predetermined interval along the longitudinal direction of the plate 20. Three orifices consists of one group, and the respective orifices in each group are displaced in the width direction of the plate 20, in the staggered shape.

Figure 10:
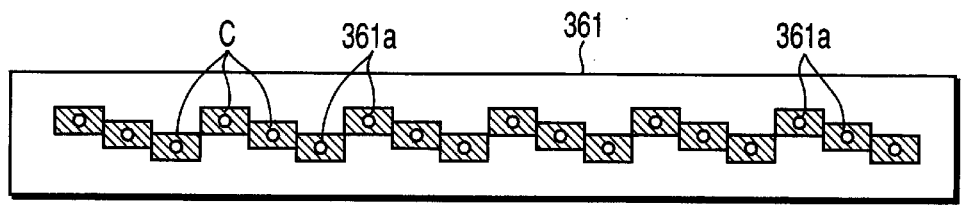
FIG. 10 is a plane view showing a state in which the beams split by the shift member irradiate the mask according to another embodiment of the present invention.

FIG. 10 shows the relationship among the shape of a mask 361 used in this example, positions of circular apertures 361a and irradiated rectangular beams C. The circular apertures 361a of the mask 361 are arranged at a predetermined interval along the longitudinal direction of the mask 361 in accordance with the orifices formed on the orifice plate 20. Three circular apertures 361a consist of one group. The circular apertures 361a in each group are displaced along the width direction of the mask 361, in the staggered shape.

Figure 11:
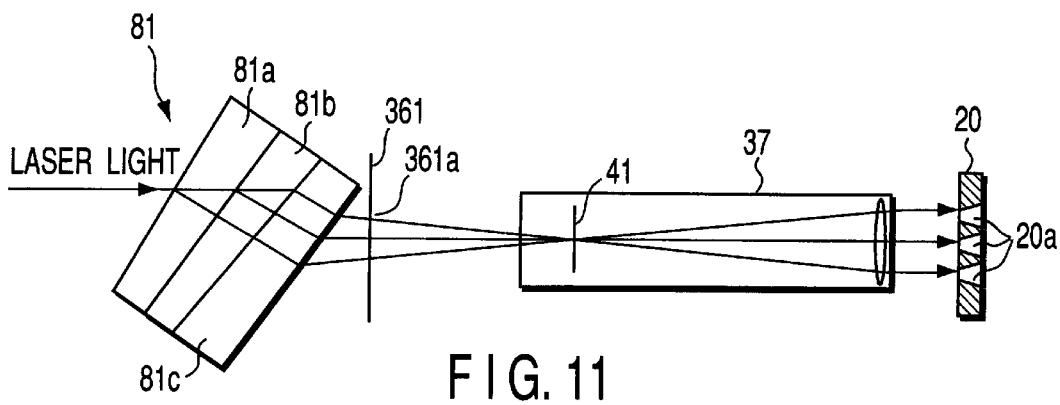
FIG. 11 is a diagram showing an optical path in which the beams split by the shift member irradiate an orifice plate through the mask and an entrance pupil of a projecting lens.

As shown in FIG. 11, the incident laser light is split by a shift member 81 serving as a shift optical means. The split laser light beams are irradiated onto the orifice positions on the orifice plate 20 through the respective circular apertures 361a and the projecting lens 37.

The shift member 81 is formed of a material such as quartz which allows the laser light to pass therethrough. First refracting plate 81a, second refracting plate 81b and third refracting plate 81c different in the inclination of the incident surface of the laser light, equal in the inclination of the emitting surface, and different in thickness, are arranged alternately and bonded at their side edges of the width direction.

The first refracting plate 81a and the third refracting plate 81c are not parallel with respect to the inclination of the incident surface and the emitting surface. The first refracting plate 81a is shaped in a wedge so that the upper part is thicker than the lower part. The third refracting plate 81c is shaped in a wedge so that the lower part is thicker than the upper part. The second refracting plate 81b is shaped to be equal in the inclination of the incident surface and the emitting surface, with a constant thickness.

The angles of inclination of the incident surface to the optical axis of the laser light, in the refracting plates 81a, 81b and 81c, are set so that the split laser light beams emitted from the emitting surfaces of the refracting plates 81a, 81b and 81c are condensed at the center of the entrance pupil 41 of the projecting lens 37 through the respective circular apertures 361a of the mask 361.

The refracting plates constituting the shift member 81 are not limited to those different in the only inclination of the incident surface. The refracting plates different in the only inclination of the emitting surface or different in both the inclinations of the incident surface and the emitting surface may be used. In short, the refracting plates only need to be set so that the split laser light beams emitted from the emitting surface of the refracting plates are condensed at the center of the entrance pupil 41 of the projecting lens 37.

Figure 12:
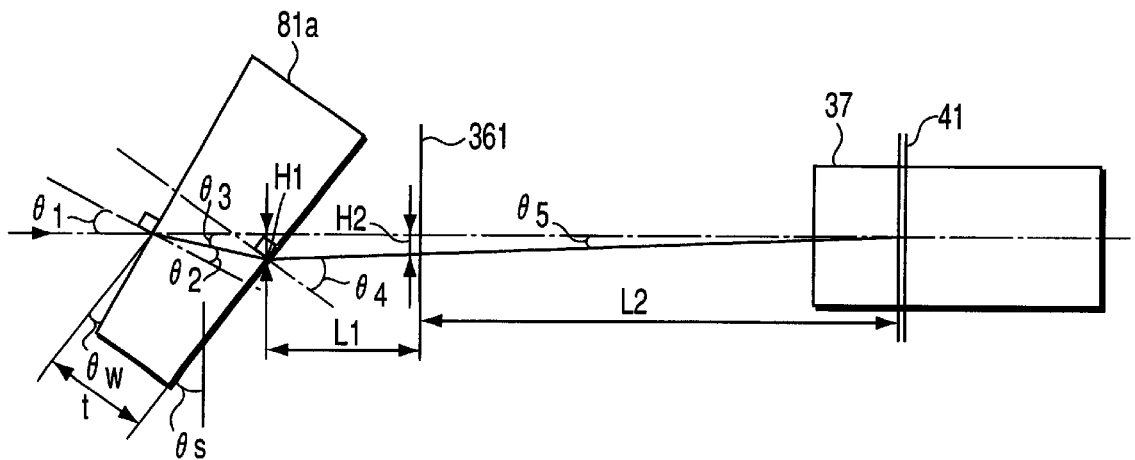
FIG. 12 is a diagram showing the relationship between the angle and the position at which the beams split by the shift member are condensed at the center of the entrance pupil of the projecting lens.
Figure 13:
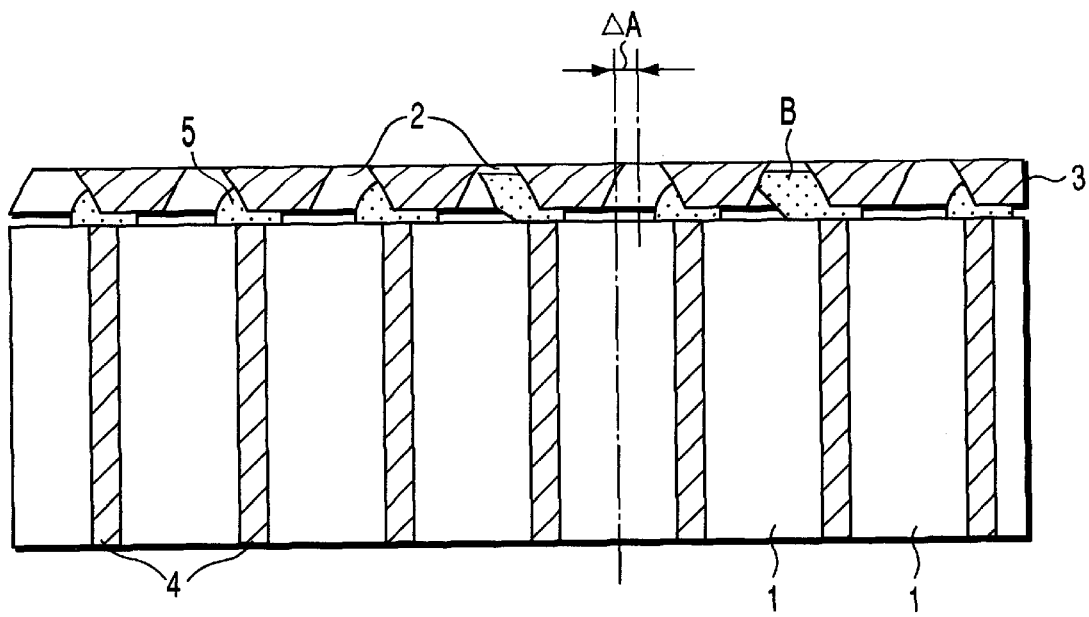
FIG. 13 is a view explaining a method of processing an orifice of a conventional ink-jet printer.
Figure 14:
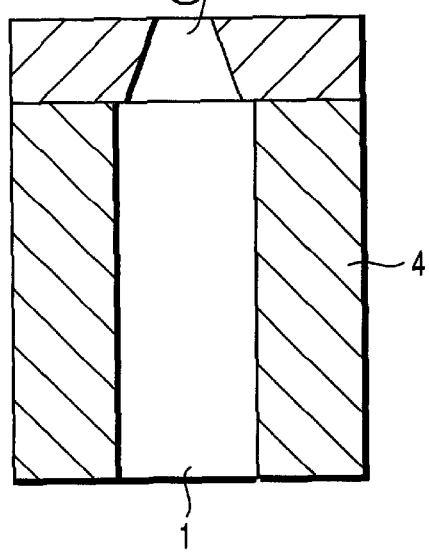
FIG. 14 is a diagram explaining necessary conditions for ink outlet from the orifice.
Figure 15:
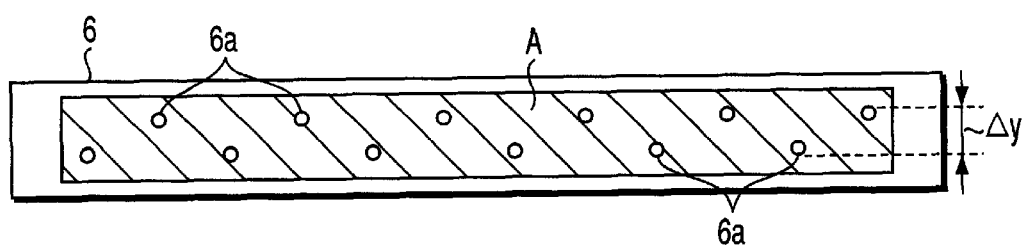
FIG. 15 is a diagram explaining a problem of the orifice processing in the conventional ink-jet printer.

FIG. 12 shows the relationship between the angle and the position where the laser light which is made incident on the incident surface of the first refracting plate 81a is split and the split beams are condensed at the center of the entrance pupil 41 of the projecting lens 37.

It is assumed that, as shown in the figure, the angle of incidence of the laser light to the incident surface of the refracting plate 81a of the laser light is represented by $\theta_1$, the angle of refraction by $\theta_2$, the angle of incidence of the laser light to the emitting surface by $\theta_3$, the angle of refraction by $\theta_4$, the wedge angle of the refracting plate 81a by $\theta w$, the angle of inclination of the emitting surface of the refracting plate 81a by $\theta s$, the angle of incidence from the emitting surface of the refracting plate 81a to the center of the entrance pupil 41 by $\theta_5$, the thickness of the center plate of the refracting plate 81a by t, the refractive index of the refracting plate 81a by n, the amount of shift on the emitting surface of the refracting plate 81a by $H_1$, the amount of shift at the position of the mask 361 by $H_2$, the distance between the emitting surface of the refracting pate 81a and the mask 361 by $L_1$, and the distance between the mask 361 and the entrance pupil 41 of the projecting lens 37 by $L_2$.

Then, the following relationships can be obtained.

$$\theta_2 = \arcsin(\sin(\theta_1)/n) \quad (17)$$

$$\theta_3 = \theta w + \theta hd\ 2 \quad (18)$$

$$\theta_4 = \arcsin(n \cdot \sin(\theta_3)) \quad (19)$$

$$\theta_5 = \theta_4 - \theta s \quad (20)$$

$$H_1 = t \cdot \sin(\theta_1 - \theta_2)/\cos(\theta w + \theta hd\ 2) \quad (21)$$

$$H_2 = L_2 \cdot H_1/(L_1 + L_2) \quad (22)$$

These relationships can be also obtained from the second refracting plate 81b and the third refracting plate 81c.

The laser light passing through the circular apertures 361a of the mask 361 is condensed at the center of the entrance pupil 41 of the projecting lens 37 by satisfying the relationships. Therefore, all the split laser light beams irradiated onto the orifice plate 20 from the projecting lens 37 are made incident vertically to the surface of the orifice plate 20.

With this operation, all orifices 20a formed on the orifice plate 20 are formed vertically to the orifice plate surface. That is, further preferable orifices 20a can be formed.

In the present embodiment, the laser light is split by the shift member 81 and the split laser light beams are irradiated rectangularly onto the respective circular apertures 361a of the mask 361. Even if the circular apertures 361a are formed on the mask 361 in the staggered shape and displaced in the width direction, all the beams can be irradiated onto the circular apertures 361a without extending the beam shape of the laser light. Therefore, the energy density per unit area of the laser light is not lowered. For this reason, the beam shape of the laser light does not need to be extended, and the efficiency of use of energy can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for producing a printer head for forming ink outlets in a staggered shape on a plate to be processed provided on a printer head housing, comprising:

a shaping optical system for shaping laser light in a band-like beam;

a mask which is arranged in an optical path of the laser light from said shaping optical system and on which a plurality of aperture patterns are formed in a staggered shape in accordance with an arranged state of said ink outlets;

shift optical means provided at an incidence side where said laser light of said mask is incident, for splitting the laser light into a plurality of beams in accordance with number of said aperture patterns and for irradiating the split beams onto the aperture patterns of said mask; and forming an image of the laser light passing through said mask, on said plate.

2. An apparatus according to claim 1, wherein said plate is formed of a macromolecular material.

3. An apparatus according to claim 1, wherein said shift optical means is constituted by a plurality of refracting plates which are formed of a material transmitting the laser light and are different in thickness, the refracting plates are equal in an inclination of their incident surfaces and emitting surfaces, and an angle of inclination of the incident surface is set so that the split laser light beams emitted from the emitting surface are made incident dispersively at a position of an entrance pupil of said image forming optical system.

4. An apparatus according to claim 1, wherein said shift optical means is constituted by a plurality of refracting plates which are formed of a material transmitting the laser light and are different in thickness, said refracting plates are different in inclination of one of the incident surface and the emitting surface or both the surfaces, and the angle of inclination of the incident surface is set so that the split laser light beams emitted from the emitting surface are made incident dispersively at a position of the entrance pupil of said image forming optical system.

5. An apparatus according to claim 1, wherein said shift optical means is constituted by a plurality of refracting plates which are formed in a plate shape with a material transmitting the laser light and are equal in thickness, and the refracting plates are inclined at different angles to an optical axis of said laser light in accordance with positions of aperture patterns of said mask which are arranged in a staggered shape.

6. An apparatus according to claim 5, wherein said plurality of refracting plates are split.

7. An apparatus according to claim 5, wherein said plurality of refracting plates are integrally formed at a predetermined interval, at an end portion of a substrate.

8. An aperture processing device, for forming an opening on a subject to be processed, comprising:

a shaping optical system for shaping laser light in a band-like beam;

a mask which is arranged in an optical path of the laser light from said shaping optical system and on which a plurality of aperture patterns are formed in a staggered shape in accordance with an arranged state of said apertures;

shift optical means provided at an incidence side where said laser light of said mask is incident, for splitting the laser light into a plurality of beams in accordance with number of said apertures and for irradiating the split beams onto the aperture patterns of said mask; and forming an image of the laser light passing through said mask, on said subject to be processed.

9. An apparatus according to claim 8, wherein said shift optical means is constituted by a plurality of refracting plates which are formed of a material transmitting the laser light and are different in thickness, the refracting plates are equal in an inclination of their incident surfaces and emitting surfaces, and an angle of inclination of the incident surface is set so that the split laser light beams emitted from the emitting surface are made incident dispersively at a position of an entrance pupil of said image forming optical system.

10. An apparatus according to claim 8, wherein said shift optical means is constituted by a plurality of refracting plates which are formed of a material transmitting the laser light and are different in thickness, said refracting plates are different in inclination of one of the incident surface and the emitting surface or both the surfaces, and the angle of inclination of the incident surface is set so that the split laser light beams emitted from the emitting surface are made incident dispersively at a position of the entrance pupil of said image forming optical system.

11. An apparatus according to claim 8, wherein said shift optical means is constituted by a plurality of refracting plates which are formed in a plate shape with a material transmitting the laser light and are equal in thickness, and the refracting plates are inclined at different angles to an optical axis of said laser light in accordance with positions of aperture patterns of said mask which are arranged in a staggered shape.

12. An apparatus according to claim 11, wherein said plurality of refracting plates are split.

13. An apparatus according to claim 11, wherein said plurality of refracting plates are integrally formed at a predetermined interval, at an end portion of a substrate.

* * * * *